Figure 1:
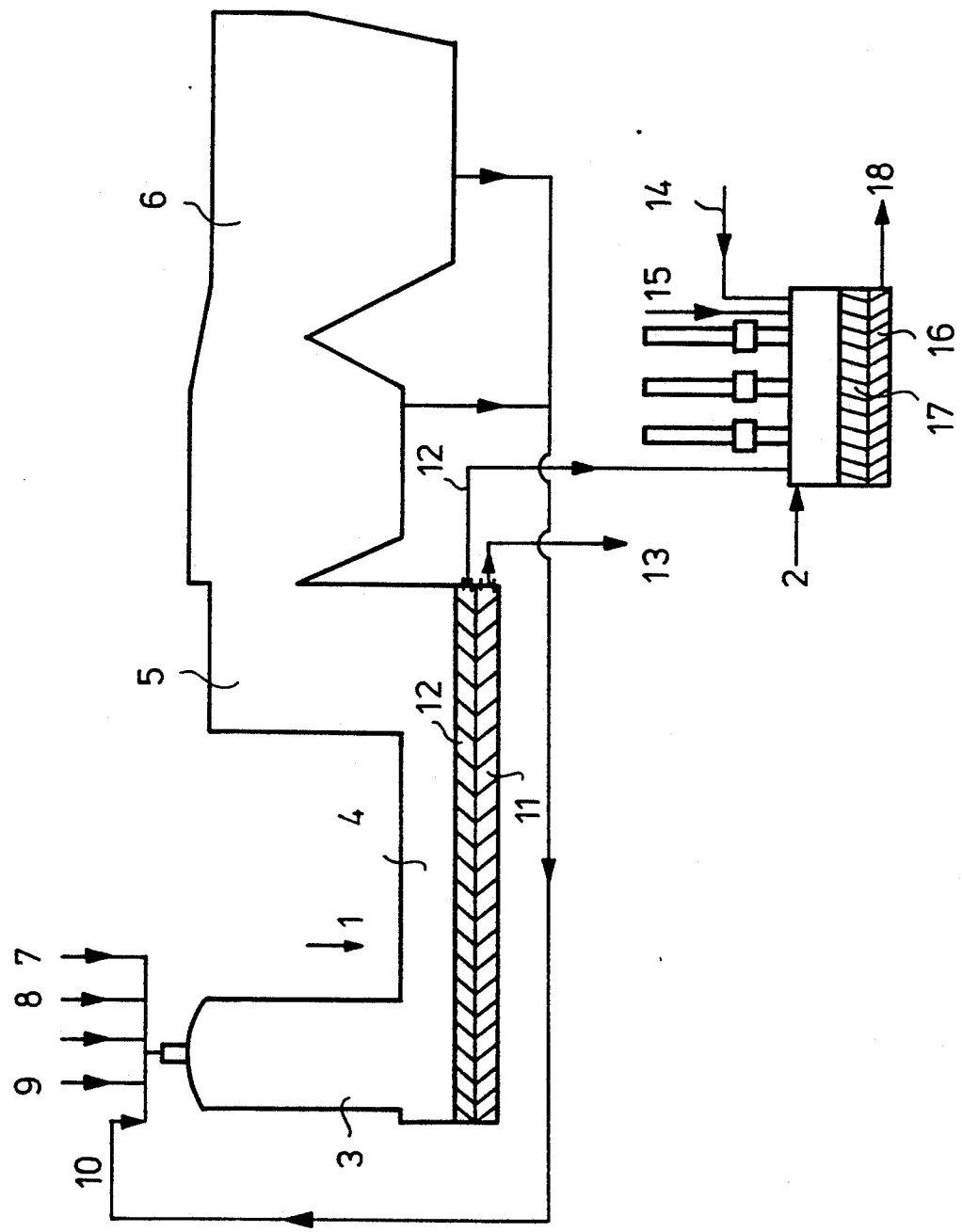

United States Patent [19]
Mäkinen

[11] Patent Number: 5,332,414
[45] Date of Patent: Jul. 26, 1994

[54] METHOD FOR PRODUCING HIGH-GRADE NICKEL MATTE AND METALLIZED SULFIDE MATTE

[75] Inventor: Tuula S. M. Mäkinen, Ulvila, Finland

[73] Assignee: Outokumpu Harjavalta Metals Oy, Harjavalta, Finland

[21] Appl. No.: 76,242

[22] Filed: Jun. 11, 1993

[30] Foreign Application Priority Data

Jun. 18, 1992 [FI] Finland ............................... 922843

[51] Int. Cl.⁵ ............................................. C22B 15/00
[52] U.S. Cl. ........................................ 75/10.1; 75/425
[58] Field of Search ............................... 75/10.1, 425

[56] References Cited

U.S. PATENT DOCUMENTS 4,195,986  4/1980  Schulz .................................. 75/425
4,668,483  5/1987  Ladd ..................................... 75/425

Primary Examiner—Peter D. Rosenberg
Attorney, Agent, or Firm—McAulay Fisher Nissen Goldberg & Kiel

[57] ABSTRACT

The invention relates to a method for producing high-grade nickel matte and highly oxidized slag in a flash smelting furnace, and for reducing the slag from the flash smelting furnace and for sulfurating the created matte in an electric furnace. The matte created in the flash smelting furnace and in the electric furnace are both directly conducted to hydrometallurgical further treatment.

2 Claims, 1 Drawing Sheet

METHOD FOR PRODUCING HIGH-GRADE NICKEL MATTE AND METALLIZED SULFIDE MATTE

The present invention relates to a method for producing high-grade nickel matte and highly oxidized slag in a flash smelting furnace, and for reducing the slag from the flash smelting furnace and sulfidizing the created matte in an electric furnace. The matte created in the flash smelting furnace and the matte created in the electric furnace are both conducted directly into further hydrometallurgical treatment.

The primary production of nickel is based on two types of raw materials: sulfidic and oxidic ores. Sulfidic ore deposits constitute 35% and oxidic 65% of the known nickel reserves in the world. The proportion of sulfidic ores in the nickel production is roughly 60%. A favourable aspect supporting the use of sulfidic ores is the fact that there are often found side components, i.e. copper, cobalt and precious metals. Moreover, sulfidic ores can be processed into concentrates with fairly low expenses. The utilization of exothermal heat bound to sulfides in smelting also means a remarkable advantage in comparison with oxidic ores.

Sulfidic ores, which contain 0.5-2% nickel, can with concentration treatment be processed into concentrates with a (Ni-Cu) content varying from 6% to 20%.

In principle the pyrometallurgical processing of sulfidic nickel concentrates is carried out in similar way as the treatment of sulfidic copper concentrates. The aim is to eliminate iron and sulfur by selective oxidation and fluxing. In the case of nickel, the primary end product is a nickel matte with a low (0.5-3%) iron content, and in the case of copper it is blister copper. Metallic copper can be produced by oxidizing $Cu_2S$ at relatively low temperatures, 1,200-1,300° C., whereas the production of metallic nickel requires temperatures over 1,600° C.

When using suspension smelting technique, the production of high-grade nickel matte from sulfidic concentrates takes place in the following way: the finely divided concentrate is dried and smelted in a flash smelting furnace into nickel matte, which still contains remarkable amounts of iron and sulfur. The nickel matte is further converted in a Pierce-Smith converter into high-grade matte, with a total content of nickel and copper in the region 72-77%. The sulfur content of the high-grade matte varies from 7% to 20%, depending on the quality of the concentrate and on the successive raffination process. Generally the iron content of high-grade matte is fairly low, <3%.

In order to improve the nickel recovery, the slags from the flash smelting furnace and the converter must be cleaned. With the flash smelting process, this is generally carried out in an electric furnace, from which the matte, obtained as a result from coke reduction, is returned to the converter. The sulfur dioxide bearing gases created in the flash smelting furnace and the converter in the course of the process are recovered and conducted into the production of sulfuric acid.

The above described two-phase process for producing high-grade nickel matte has been found good and reliable, but it has certain drawbacks. Let us mention high investment costs, for example. Moreover, the process creates two $SO_2$ bearing gas flows, one of which, i.e. the converter gas flow, is very fluctuating owing to the nature of the batch process, and this makes the gas treatment and sulfuric acid production expensive. The tilting of the converter also brings smoke hazards to the working area, because the converter hood must be shifted during the converting process. In addition to this, molten materials must in this process be transferred in open vessels from the flash smelting furnace into the converter, from the converter to the electric furnace and from the electric furnace to the converter. Owing to this transfer of the melts, several different intermediary products are created in the process, and their treatment causes additional expenses.

The Finnish patent application 890,395 introduces a process and apparatus for the production of high-grade nickel matte, with an aim to simplify the above described production process of high-grade nickel matte and to eliminate some drawbacks found therein. In this method, the disadvantages caused by the converter process are eliminated by using a combination of suspension smelting furnace and electric furnace in the production of high-grade nickel matte.

In the production process of high-grade nickel matte of the FI patent application 890,395, high-grade matte is produced directly in a suspension smelting furnace, such as a flash smelting furnace. As a consequence of the high nickel content of the high-grade matte and the high oxygen potential of the furnace, the nickel content of the slag created in the furnace also is high. This slag is reduced in an electric furnace, which is a separate unit or is connected to the suspension smelting furnace via a specific separation means. The matte created in the electric furnace is recirculated, at least partly, to the suspension smelting furnace. The recirculated matte further reduces the slag from the suspension smelting furnace, thus decreasing the quantity of material to be reduced in the electric furnace. The high-grade nickel matte created in the flash smelting furnace can also be recirculated into the electric furnace. Accordingly, this method and apparatus for producing high-grade nickel matte makes it possible to eliminate the converter step from the process.

The object of the present invention is to further simplify the production process of high-grade nickel matte. In this method, the production of high-grade nickel matte from sulfidic nickel concentrate also is carried out directly in a flash smelting furnace, without the converter. The valuable metals dissolved in the slag from the flash smelting furnace are recovered in an electric furnace, where, in addition to oxidized slag and reductant, there is fed some sulfur bearing substance or other substance lowering the melting point, for instance copper, or some fluidity-improving agent, in order to adjust the melting point of the matte. Without the sulfur addition, the sulfur content of the metal sulfide matte would remain very low, and its melting point and viscosity respectively high. Both the high-grade nickel matte created in the flash smelting furnace and the matte created in the electric furnace are conducted directly into hydrometallurgical treatment without additional recirculation. The essential novel features of the invention are apparent from the appended patent claims.

As was explained above, certain nickel ores can with modern methods be processed into fairly high-quality concentrates. On the other hand, a concentrate that has a low iron/magnesia ratio and is consequently not suited to suspension smelting, can with concentration technical methods be divided into a high-grade fraction (high Ni, suitable Fe/MgO) and into a lower-grade fraction, of which the latter can be treated hydrometallurgically.

When the above mentioned high-grade concentrate is treated according to the method of the present invention, the recovery of nickel into the high-grade matte of the flash smelting furnace already becomes so high, that a recirculation of the electric furnace matte, serving as the reductant, back to the flash smelting furnace is unnecessary. When using a sufficiently concentrated feed mixture, the nickel recovery into the flash smelting furnace matte can be >50%.

When smelting a raw material with a low nickel content into high-grade matte, the slag quantity in the flash smelting furnace is so high, that it is capable of leaching all nickel contained in the concentrate, so that from the flash smelting furnace, there is not obtained any high-grade matte at all, but only highly oxidized slag with a high nickel content. When this slag is then treated in an electric furnace, the nickel is recovered in a metallized sulfide matte with a high iron content. As a consequence, high iron quantities must be treated in the hydrometallurgical process. In order to recover at least part of the nickel contained in the feed as high-grade matte with a low iron content, some reductant must be fed into the flash smelting furnace; in the method of the FI patent application 890,395, this reductant is the electric furnace matte.

When applying the production process of high-grade nickel matte of the present invention to either a new production plant or to an existing plant, similar advantages are achieved, as for the process and equipment, as in the method of the FI patent application 890,395. When applying the method of the present invention, the process and equipment are further simplified, when compared to the method of the patent application 890,395, so that the recirculation of granulated or molten electric furnace matte becomes unnecessary.

The invention is explained in more detail with reference to the appended schematical illustration 1, which is a side-view cross-section of a preferred embodiment of the invention.

The apparatus for realizing the method of the invention advantageously comprises a flash smelting furnace 1 and an electric furnace 2. The essential parts of the flash smelting furnace 1 are the reaction shaft 3, the settler 4 and the uptake shaft 5. A waste-heat boiler 6 is joined to the uptake shaft.

In the method of the invention, into the top part of the reaction shaft 3 of the flash smelting furnace, downwardly from the arch thereof, there is fed oxidizing reaction gas 7, concentrate 8, slag-forming agent i.e. flux 9, and flue dust 10 obtained from the cooling of exhaust gases. In addition to the flux, some other slag-forming agent can also be fed into the furnace, for instance waste from the leaching process of the electric furnace matte. In the reaction shaft the fed materials react with each other and form a matte layer 11 on the bottom of the settler 4, and a slag layer 12 on top of the matte layer. As was mentioned above, the created matte is high-grade nickel matte and the slag is highly oxidized slag. The gases created in the smelting furnace are removed via the uptake shaft 5 to the waste-heat boiler 6, wherefrom the flue dusts 10 are recirculated back into the smelting furnace.

After granulation the high-grade nickel matte created in the flash smelting is conducted directly into hydrometallurgical leaching 13, and the slag from the flash smelting furnace 1 is conducted to the electric furnace 2. In the electric furnace, the slag is reduced with coke 14 used as a reductant. In addition to this, some sulfur bearing material such as pyrite 15 is conducted into the electric furnace. As a result from the reduction process, there is created metal sulfide matte 16 and slag 17. According to the invention, the metal sulfide matte is conducted further to hydrometallurgical treatment 18, which either takes place together with the matte obtained from the flash smelting furnace or separately. The valuable metal content of the created slag is so low that it can be treated as waste.

It is apparent from the above specification that the method of the present invention is not only remarkably simpler than the conventional method, but also clearly simpler than the described method of the state of the art, where the electric furnace matte is recirculated and the flash smelting furnace matte can still be further conducted into an electric furnace. Among the advantages of the present invention, let us point out for instance that the recovery of cobalt is better than in the conventional or in the described state-of-the-art method, for in these the cobalt content of the slag remains high because of the recirculation.

In the method of the invention, the iron bearing leaching residue created in the hydrometallurgical further treatment can also be utilized, because the said residue can be employed for example for adjusting the Fe/MgO ratio of the slag created in the flash smelting furnace, and thus for improving poor fluidity possibly caused by a high MgO content. In the direct smelting method, nearly all iron is oxidized into the slag, which in part weakens the MgO content of the slag.

EXAMPLE

The method of the present invention was applied to a sulfidic nickel concentrate alloy containing 15.7% nickel, 1.0% copper, 0.47% cobalt, 30.2% iron, 27.1% sulfur and 7.2% silicon oxide. The concentrate was fed into the reaction shaft of a flash smelting furnace, where there was also supplied, per ton of fed concentrate, 91 kg waste from the leaching process of the electric furnace matte, 253 kg silicon oxide bearing flux and 83 kg flue dust separated from the exhaust gases of the flash smelting furnace. Into the reaction shaft there was also fed, per a ton of concentrate, 347 Nm$^3$ oxygen-air mixture, with an oxygen content of 80%.

The product obtained from the settler of the flash smelting furnace was high-grade nickel matte containing 70.6% nickel, 5.9% copper, 0.55% cobalt and 18.6% sulfur. The molten matte was granulated and conducted to hydrometallurgical further treatment. In addition to this, from the settler of the flash smelting furnace there was obtained slag containing 7.8% nickel, 0.2% sulfur, 34.1% iron and 27.7% silicon oxide. The recovery of nickel contained in the concentrate to the high-grade matte of the flash smelting furnace was roughly 50%.

The slag from the flash smelting furnace was further conducted into an electric furnace, where the slag was reduced with coke as a surface reduction. In order to adjust the melting point of the metal sulfide matte created as a result of the reduction, pyrite was also fed into the furnace. Without an addition of some sulfur bearing material, the product obtained from the reduction of oxidized slag is a matte with an extremely low sulfur content and with a high melting point. The matte from the electric furnace was also granulated and then treated hydrometallurgically in order to recover the nickel therefrom. The waste slag obtained from the electric furnace contained 0.3% nickel, 0.2% copper and 0.02% cobalt.

In this process the recovery of nickel is extremely high, because the nickel content of the waste slag represents a nickel loss of about 1.6% only. The recovery of cobalt also is higher than in the conventional process or in the described state-of-the-art process, because the method of the invention does not include recirculation of matte or slag, which lead to the concentration of copper for instance in the waste slag.

I claim:

1. A method for producing high-grade nickel matte and metallized sulfide matte, including the following steps:
   a) feeding nickel sulfide concentrate and a reaction gas together with flux and flue dust, into a reaction shaft of a flash smelting furnace;
   b) in the flash smelting furnace, there are created high-grade nickel matte and slag;
   c) granulating the high-grade nickel matte;
   d) hydrometallurgically treating the high-grade nickel matte after the granulating step for recovery of nickel therefrom;
   e) conducting the slag created in the flash smelting furnace into an electric furnace together with a reductant and with a sulfur bearing or other material lowering the melting point or improving fluidity, so that in the electric furnace there are created metallized sulfide matte and waste slag; and
   f) hydrometallurgically treating the metallized sulfide matte.

2. A method according to claim 1, further including conducting an iron bearing leaching residue from the leaching process of the electric furnace matte into the flash smelting furnace.

* * * * *